United States Patent
Cox et al.

(10) Patent No.: US 9,613,215 B2
(45) Date of Patent: Apr. 4, 2017

(54) METHOD AND SYSTEM FOR IMPLEMENTING A SECURE CHAIN OF TRUST

(75) Inventors: Michael Cox, Menlo Park, CA (US); Phillip Smith, Sunnyvale, CA (US)

(73) Assignee: NVIDIA CORPORATION, Santa Clara, CA (US)

( * ) Notice: Subject to any disclaimer, the term of this patent is extended or adjusted under 35 U.S.C. 154(b) by 1702 days.

(21) Appl. No.: 12/100,918

(22) Filed: Apr. 10, 2008

(65) Prior Publication Data

US 2009/0259854 A1    Oct. 15, 2009

(51) Int. Cl.
| | |
|---|---|
| *G06F 11/30* | (2006.01) |
| *G06F 21/57* | (2013.01) |
| *G09G 5/00* | (2006.01) |
| *G09G 5/36* | (2006.01) |

(52) U.S. Cl.
CPC ........... *G06F 21/575* (2013.01); *G09G 5/001* (2013.01); *G09G 5/363* (2013.01); *G09G 2330/02* (2013.01)

(58) Field of Classification Search
CPC ...... G06F 21/572; G06F 21/575; G09G 5/365
USPC ........................................................ 713/189
See application file for complete search history.

(56) References Cited

U.S. PATENT DOCUMENTS

| | | |
|---|---|---|
| 5,457,748 A | 10/1995 | Bergum et al. |
| 6,046,676 A | 4/2000 | Ward et al. |
| 6,073,244 A * | 6/2000 | Iwazaki ........................ 713/322 |
| 6,185,678 B1 | 2/2001 | Arbaugh et al. |
| 7,430,585 B2 | 9/2008 | Sibert |
| 7,721,096 B2 * | 5/2010 | Chiasson et al. .............. 713/168 |
| 7,774,596 B2 | 8/2010 | Flynn |
| 8,719,585 B2 | 5/2014 | Grigor et al. |
| 9,069,706 B2 | 6/2015 | Sriram et al. |
| 2001/0011347 A1 | 8/2001 | Narayanaswamy et al. |
| 2002/0085721 A1 * | 7/2002 | Saneto et al. ................. 380/277 |

(Continued)

FOREIGN PATENT DOCUMENTS

| | | |
|---|---|---|
| EP | D961193 | 12/1999 |
| EP | 1845470 | 10/2007 |

(Continued)

OTHER PUBLICATIONS

Wuhan University Journal of Natural Sciences, vol. 11 (Nov), No. 6, pp. 1449-1452, "Design and implementation of a bootstrap trust chain", Yu Fajiang & Zhang Huanguo; INSPEC association number: 9445762.

(Continued)

*Primary Examiner* — Oscar Louie
*Assistant Examiner* — James Forman

(57) ABSTRACT

A method, an integrated circuit and a system for implementing a secure chain of trust is disclosed. While executing secure boot code in a secure boot mode, less-secure boot code may be authenticated using a secret key. A secure key may also be calculated or generated during the secure boot mode. After control is turned over to the authenticated less-secure boot code, at least one application may be authenticated using the secure key. Once authenticated in the less-secure boot mode, the application may be executed by the programmable integrated circuit. In this manner, a secure chain of trust may be implemented for the programmable integrated circuit.

12 Claims, 12 Drawing Sheets

(56) References Cited

U.S. PATENT DOCUMENTS

| | | |
|---|---|---|
| 2003/0023822 A1 | 1/2003 | Scott et al. |
| 2003/0056107 A1 | 3/2003 | Cammack et al. |
| 2003/0084337 A1 | 5/2003 | Simionescu et al. |
| 2003/0095664 A1 | 5/2003 | Asano et al. |
| 2003/0115471 A1 | 6/2003 | Skeba |
| 2003/0177373 A1 | 9/2003 | Moyer et al. |
| 2004/0193873 A1 | 9/2004 | England |
| 2005/0111664 A1* | 5/2005 | Ritz et al. ............... 380/255 |
| 2005/0114664 A1* | 5/2005 | Davin ..................... 713/170 |
| 2005/0132229 A1 | 6/2005 | Zhang et al. |
| 2005/0138409 A1* | 6/2005 | Sheriff et al. ........... 713/200 |
| 2005/0232415 A1 | 10/2005 | Little et al. |
| 2005/0283601 A1 | 12/2005 | Tahan |
| 2005/0289067 A1 | 12/2005 | Lampson et al. |
| 2006/0002561 A1 | 1/2006 | Choi et al. |
| 2006/0005237 A1* | 1/2006 | Kobata et al. ............ 726/12 |
| 2006/0090084 A1* | 4/2006 | Buer ....................... 713/189 |
| 2006/0136748 A1 | 6/2006 | Bade et al. |
| 2006/0174109 A1 | 8/2006 | Flynn |
| 2006/0174240 A1 | 8/2006 | Flynn |
| 2006/0179302 A1* | 8/2006 | Hatakeyama ............ 713/164 |
| 2006/0179308 A1* | 8/2006 | Morgan et al. .......... 713/168 |
| 2006/0224878 A1* | 10/2006 | Datta et al. ................ 713/2 |
| 2007/0022243 A1* | 1/2007 | Rudelic ................... 711/103 |
| 2007/0027988 A1 | 2/2007 | Lavin et al. |
| 2007/0055881 A1 | 3/2007 | Fuchs et al. |
| 2007/0083744 A1 | 4/2007 | Seok |
| 2007/0124409 A1 | 5/2007 | Sibert |
| 2007/0169098 A1 | 7/2007 | Kikuchi |
| 2007/0198851 A1 | 8/2007 | Goto |
| 2007/0217614 A1 | 9/2007 | Fujiwara et al. |
| 2007/0220500 A1* | 9/2007 | Saunier ................... 717/162 |
| 2007/0234130 A1 | 10/2007 | Sullivan et al. |
| 2007/0300207 A1 | 12/2007 | Booth et al. |
| 2008/0028235 A1* | 1/2008 | Smith et al. ............. 713/190 |
| 2008/0040598 A1 | 2/2008 | Lee et al. |
| 2008/0077800 A1* | 3/2008 | Wang et al. ............. 713/187 |
| 2008/0077973 A1 | 3/2008 | Zimmer et al. |
| 2008/0082680 A1 | 4/2008 | Grewal et al. |
| 2008/0086630 A1 | 4/2008 | Rodgers et al. |
| 2008/0086652 A1 | 4/2008 | Krieger et al. |
| 2008/0114994 A1 | 5/2008 | Iyer et al. |
| 2008/0137848 A1 | 6/2008 | Kocher et al. |
| 2008/0165952 A1 | 7/2008 | Smith et al. |
| 2008/0256595 A1 | 10/2008 | Schunter et al. |
| 2008/0282084 A1* | 11/2008 | Hatakeyama ............ 713/155 |
| 2009/0202069 A1* | 8/2009 | Cox et al. ................. 380/44 |
| 2009/0205053 A1 | 8/2009 | Sriram et al. |
| 2009/0259854 A1 | 10/2009 | Cox et al. |
| 2010/0185845 A1 | 7/2010 | Takayama et al. |
| 2010/0189340 A1* | 7/2010 | Ueda ....................... 382/145 |

FOREIGN PATENT DOCUMENTS

| | | |
|---|---|---|
| GB | 2427720 | 1/2007 |
| JP | 2004530235 A | 9/2004 |
| JP | 2005122733 A | 5/2005 |
| TW | 200306107 | 11/2003 |
| WO | WO02/21763 | 3/2002 |
| WO | 2006086301 | 8/2006 |
| WO | 2008009112 | 1/2008 |
| WO | WO2008/071572 | 6/2008 |

OTHER PUBLICATIONS

Yano Koshio, et al. Hardware-Dependent Software-Role of Firmware Study Bootloader from CPU Mechanism/Design of BIOS, Interface, Japan, CQ Publishing Co., Ltd., Jan. 1, 2008, vol. 34, No. 1, p. 95-p. 104.

Schneier, B., "Applied Cryptography", 1996, John Wiley & Sons, 2nd Edition, pg. 190-191.

* cited by examiner

METHOD AND SYSTEM FOR IMPLEMENTING A SECURE CHAIN OF TRUST

RELATED APPLICATIONS

The present application is related to U.S. patent application Ser. No. 12/029,432, filed Feb. 11, 2008, entitled "METHOD AND SYSTEM FOR GENERATING A SECURE KEY," naming Michael Cox, Phillip Smith, and Stephen Lew and as inventors, assigned to the assignee of the present invention. That application is incorporated herein by reference in its entirety and for all purposes.

The present application is related to U.S. patent application Ser. No. 12/029,464, filed Feb. 11, 2008, entitled "SECURE UPDATE OF BOOT IMAGTE WITHOUT KNOWLEDGE OF SECURE KEY," naming Gordon Grigor and Phillip Smith and as inventors, assigned to the assignee of the present invention. That application is incorporated herein by reference in its entirety and for all purposes.

The present application is related to U.S. patent application Ser. No. 12/029,463, filed Feb. 11, 2008, entitled "MECHANISM FOR SECURE DOWNLOAD OF CODE TO A LOCKED SYSTEM," naming Phillip Smith, John Sasinowski, and Gordon Grigor as inventors, assigned to the assignee of the present invention. That application is incorporated herein by reference in its entirety and for all purposes.

The present application is related to U.S. patent application Ser. No. 12/029,463, filed Feb. 11, 2008, entitled "HANDLING OF SECURE STORAGE KEY IN ALWAYS ON DOMAIN," naming Michael Cox, Gordon Grigor, Phillip Smith, and Parthasarathy Sriram as inventors, assigned to the assignee of the present invention. That application is incorporated herein by reference in its entirety and for all purposes.

BACKGROUND OF THE INVENTION

Security mechanisms are commonly used by computer systems to secure data stored on the computer system and/or secure the operation of the system itself. For example, data may be encrypted to prevent or limit unauthorized access to the data. Additionally, computer systems may authenticate a boot image before it is executed by the central processing unit (CPU), thereby improving the security of the system itself as well as the data stored on the system.

Conventional computer systems utilize a trusted platform module (TPM) to perform authentication operations. For example, the CPU may execute microcode which accesses a boot image and sends the boot image to the TPM for authentication. The TPM is often implemented in software or in a hardware device separate from the CPU. Once authenticated, the conventional computer system will run the authenticated boot code for booting the system.

Although TPMs are commonly used on desktop (e.g., non-portable) computer systems, they are susceptible to various avenues of attack. For example, unauthorized users may compromise system and/or data security by executing code-based attacks, hardware-based attacks, or the like, on the TPM or other system components. As such, TPMs provide insufficient security measures for certain systems and/or data.

SUMMARY OF THE INVENTION

Accordingly, a need exists for a security mechanism which improves computer system security and/or the security of data accessed by the computer system. A need also exists for security mechanisms which implement a more secure chain of trust for boot code, applications, data, etc., accessed by a computer system. Additionally, a need exists for such improved security mechanisms for use with or on portable electronic devices. Embodiments of the present invention provide novel solutions to these needs and others as described below.

Embodiments of the present invention are directed to a method, an integrated circuit and a system for implementing a secure chain of trust. More specifically, while executing secure boot code in a secure boot mode, less-secure boot code may be authenticated using a secret key (e.g., a secure boot key confined within and used exclusively by the integrated circuit, or programmable integrated circuit, executing the secure boot code). A secure key (e.g., a secure storage key for performing security operations associated with data and/or applications accessed by the integrated circuit) may also be calculated or generated during the secure boot mode. After control is turned over to the authenticated less-secure boot code, at least one application (e.g., an operating system, an application utilizing digital rights management (DRM) or other security mechanisms, etc.) may be authenticated using the secure key (e.g., also confined within and used exclusively by the integrated circuit). Once authenticated in the less-secure boot mode, the application may be executed by the integrated circuit (e.g., in an even less-secure mode or a non-secure mode). In this manner, a secure chain of trust (e.g., from secure boot code, to less-secure boot code, and to even less-secure or non-secure applications) may be implemented for the integrated circuit.

In one embodiment, a method of implementing a secure chain of trust for an integrated circuit includes, while executing first boot code in a secure boot mode, authenticating second boot code using a secret key. Also while executing the first boot code in the secure boot mode, a secure key is generated based upon the secret key and a unique identifier associated with the programmable integrated circuit. Access is limited to the secret key before exiting the secure boot mode. While executing the second boot code in a boot mode, an application is authenticated for execution on the programmable integrated circuit, wherein the authenticating further includes authenticating the application using the secure key. The boot mode is exited and the application is executed. The secure key may also be used to perform an operation (e.g., an encryption operation, decryption operation, etc.) on data accessible to the programmable integrated circuit. Additionally, the executing of the first boot code may implement a warm boot process or a cold boot process in one embodiment. Further, information about a peripheral operable to communicate with the programmable integrated circuit (e.g., and located externally to the programmable integrated circuit) may be accessed. While executing the first boot code, at least one component of the programmable integrated circuit may be configured to improve the performance of the peripheral, wherein the configuring further includes configuring the at least one component based upon the information about the peripheral.

In another embodiment, an integrated circuit for use in a portable electronic device includes a memory for storing first boot code. A processor is coupled to the memory and is operable to execute the first boot code in a secure boot mode of the integrated circuit, wherein the processor is further operable to execute second boot code in a boot mode of the integrated circuit, and wherein the processor is further operable to execute an application. A secure encryption engine is coupled to the processor and is operable to implement a secure chain of trust by authenticating the second boot code using a secret key in the secure boot mode, generating a secure key based upon the secret key and a unique identifier associated with the integrated circuit, and authenticating the application using the secure key in the boot mode prior to execution of the application by the processor.

In yet another embodiment, a system includes an integrated circuit. The integrated circuit includes a memory for storing first boot code and a processor coupled to the memory and for executing the first boot code in a secure boot mode of the integrated circuit, wherein the processor is further operable to execute other boot code in another boot mode of the integrated circuit, and wherein the processor is further operable to execute an application. The integrated circuit also includes a secure encryption engine coupled to the processor and for implementing a secure chain of trust by authenticating the other boot code using a secret key in the secure boot mode, generating a secure key based upon the secret key and a unique identifier associated with the integrated circuit, and authenticating the application using the secure key in the other boot mode prior to execution of the application by the processor. The system also includes a peripheral coupled to the integrated circuit, the peripheral for storing information accessible to a component selected from a group consisting of the processor and the secure encryption engine.

BRIEF DESCRIPTION OF THE DRAWINGS

The present invention is illustrated by way of example, and not by way of limitation, in the figures of the accompanying drawings and in which like reference numerals refer to similar elements.

DETAILED DESCRIPTION OF THE INVENTION

Figure 1:
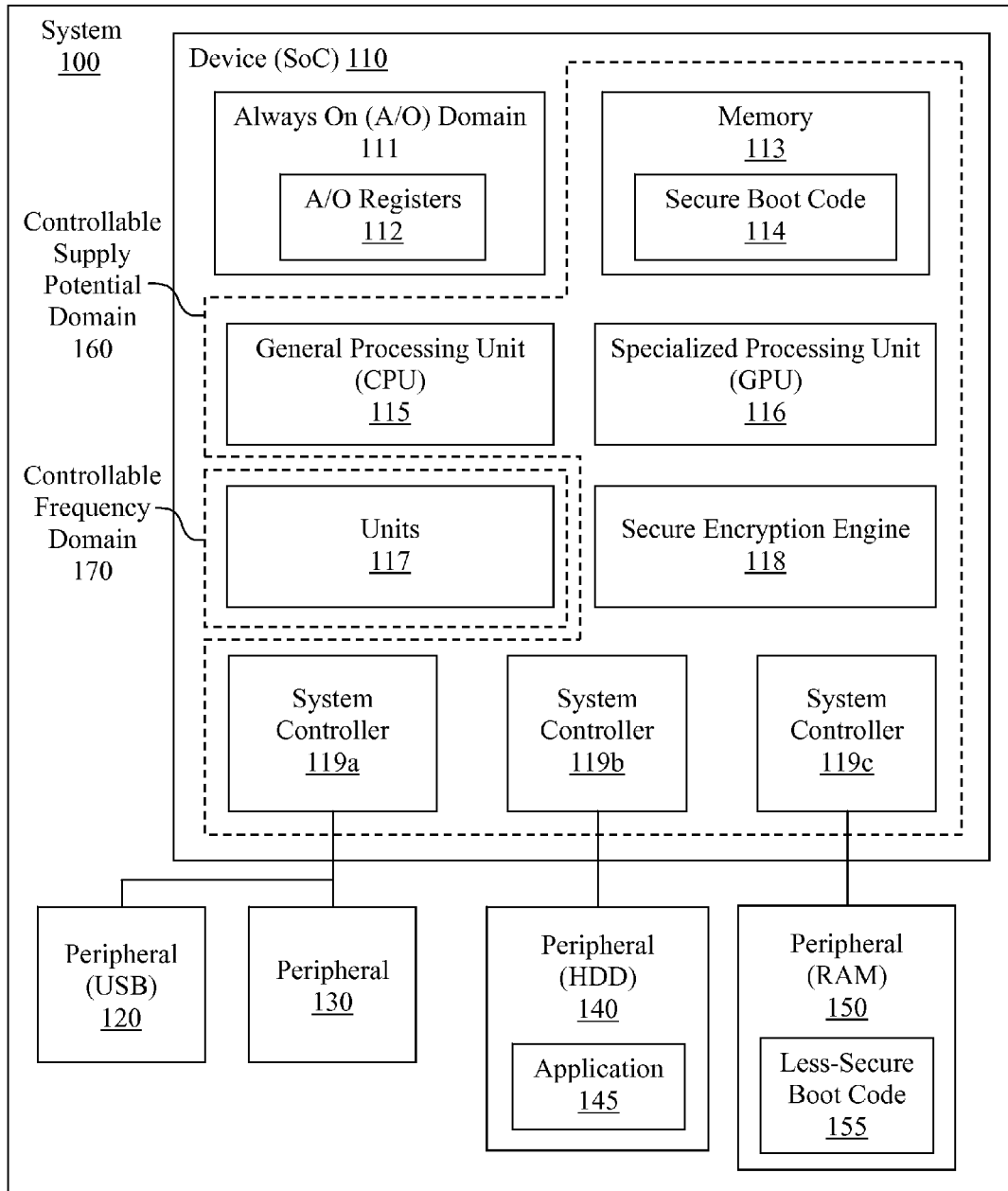
FIG. 1 shows a block diagram of an exemplary system for implementing a secure chain of trust in accordance with one embodiment of the present invention.

Reference will now be made in detail to embodiments of the present invention, examples of which are illustrated in the accompanying drawings. While the present invention will be discussed in conjunction with the following embodiments, it will be understood that they are not intended to limit the present invention to these embodiments alone. On the contrary, the present invention is intended to cover alternatives, modifications, and equivalents which may be included with the spirit and scope of the present invention as defined by the appended claims. Furthermore, in the following detailed description of the present invention, numerous specific details are set forth in order to provide a thorough understanding of the present invention. However, embodiments of the present invention may be practiced without these specific details. In other instances, well-known methods, procedures, components, and circuits have not been described in detail so as not to unnecessarily obscure aspects of the present invention.

Notation and Nomenclature

Some portions of the detailed descriptions which follow are presented in terms of procedures, logic blocks, processing and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signals capable of being stored, transferred, combined, compared, and otherwise manipulated in a computer system.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing the terms such as "accepting," "accessing," "adding," "adjusting," "analyzing," "applying," "assembling," "assigning," "authenticating," "calculating," "capturing," "combining," "comparing," "collecting," "configuring," "creating," "decreasing," "decrypting," "defining," "depicting," "detecting," "determining," "displaying," "encrypting," "establishing," "executing," "exiting," "generating," "grouping," "identifying," "increasing," "initiating," "interacting," "limiting," "modifying," "monitoring," "moving," "outputting," "padding," "performing," "placing," "presenting," "processing," "programming," "querying," "removing," "repeating," "sampling," "sorting," "storing," "subtracting," "tracking," "transforming," "using," "validating," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the Invention

FIG. 1 shows a block diagram of exemplary system 100 for implementing a secure chain of trust in accordance with one embodiment of the present invention. As shown in FIG. 1, system 100 comprises device or system on a chip (SoC) 110 and at least one peripheral 120-150. In one embodiment, system 100 may implement a general-purpose computer system, an embedded computer system, a laptop computer system, a hand-held computer system, a portable computer system, a portable electronic device, a stand-alone computer system, a game console, some combination thereof, etc. Additionally, peripherals 120-150 may be internal and/or external peripheral devices, such as a keypad, cursor controller, communication port, storage device (e.g., hard disk drive, flash memory, random access memory (RAM), read-only memory (ROM), etc.), etc. In another embodiment, the peripherals may be a communication interface for communicating (e.g., in accordance with a standard such as USB, USB 2.0, Firewire, PCI-Express, SATA, eSATA, etc.) with a device or system external to system 100, a device or system coupled to system 100 via one or more interfaces, etc. One or more of peripherals 120-150 may include fuses 300 of FIG. 3 in one embodiment.

In one embodiment, at least one of peripherals 120-150 and/or at least one component of device 110 (e.g., memory 113) may store computer-readable code (e.g., for execution by general processing unit 115, specialized processing unit 116, etc.) for implementing a secure chain of trust for system 100 (e.g., in accordance with one or more of the processes depicted in FIGS. 4A through 9). For example, during a secure boot mode of system 100, processor 115 may execute secure boot code 114 (e.g., stored in memory 113) to authenticate less-secure boot code 155 (e.g., stored in peripheral 150). Once authenticated, less-secure boot code 155 may be executed (e.g., by processor 115) during a less-secure boot mode. Application 145 (e.g., an operating system for device 110 and/or system 100) may be authenticated during the less-secure boot mode. Once application 145 is authenticated, the application may be executed (e.g., by processor 115 in a subsequent less-secure or non-secure mode). In this manner, a secure chain of trust for system 100 may be implemented by transferring control (e.g., from secure boot code 114 to less-secure boot code 155, from less-secure boot code 155 to application 145, etc.) to authenticated or trusted code (e.g., which has been authenticated during execution of other authenticated or trusted code) during the booting and/or operation of system 100.

Processor 116 may comprise a graphics processing unit or GPU in one embodiment, while processor 115 may comprise a central processing unit or CPU in one embodiment. Alternatively, processor 115 may comprise a combined GPU/CPU capable of performing graphics processing operations (e.g., associated with the processing and display of graphical data) and other processing operations (e.g., more general central processing operations)

Secure encryption engine 118 may perform authentication operations for implementing the secure chain of trust in one embodiment. For example, while in the secure boot mode (e.g., during execution of secure boot code 114), engine 118 may authenticate less-secure boot code 155 (e.g., accessed from peripheral 150) using a secret key (e.g., a secure boot key (SBK)). The secret key (e.g., SBK 330) may be accessed from a secure portion (e.g., 310) of fuses 300 (e.g., of FIG. 3) in one embodiment, where fuses 300 may be located in at least one component of device 110 (e.g., on chip), at least one of peripherals 120-150, some combination thereof, etc. Alternatively, the secret key may be accessed from key slot 210 of engine 118, where key slot 210 may store SBK 330 accessed from fuses 300, a key stored in another portion of system 100 (e.g., stored within always on (A/O) registers 112 of A/O domain 111 and accessed in response to a reset of system 100), etc.

Engine 118 may authenticate application 145 (e.g., accessed from peripheral 140) using a secure key during a less-secure boot mode (e.g., during execution of less-secure boot code 155). The secure key may be calculated or generated (e.g., by engine 118) during a secure boot mode (e.g., during execution of secure boot code 114), during a less-secure boot mode (e.g., during execution of less-secure boot code 155), some combination thereof, etc. Alternatively, the secure key may be supplied by a user (e.g., a system manufacturer prior to shipping system 100, etc.). And in one embodiment, the secure key may be accessed from key slot 220 in engine 118, where key slot 220 may store a secure key which was accessed from another location (e.g., during the secure boot mode), calculated or generated (e.g., during the secure boot mode), etc.

In one embodiment, the secure key may be calculated or generated using repurposed data (e.g., used for purposes other then generation of the secure key) and/or additional data. The repurposed data may include a secret key (e.g., SBK 330), a unique device identifier (e.g., 350 accessed from non-secure portion 320 of fuses 300), or other data. UID 350 may include a serial number (e.g., of device 110, system 100, etc.), a MAC identifier (e.g., of device 110, system 100, etc.), etc. The additional data may include secure device data (e.g., 340 accessed from secure portion 310 of fuses 300) such as a device key (e.g., unique to device 110, unique to system 100, shared by device 110 and at least one other similar device, shared by system 100 and at least one other similar system, etc.) or the like, where the secure device data may be inaccessible outside of device 110 and/or outside of system 100 after device 110 is placed in an operational mode (e.g., after incorporation into system 100, after system 100 is shipped to a store for sale or an end-user for use, etc.).

Further, in one embodiment, the secure key may be calculated or generated (e.g., by engine 118) in accordance with the following relation:

$$SSK=AES[SBK; UID\char`^AES(SBK; DK)]$$

where "DK" may be secure device data (e.g., 340), "SBK" may be a secure boot key (e.g., 330), and "UID" may be a unique device identifier (e.g., 350). Accordingly, the SBK may be encrypted using DK as the encryption key, where the encryption may utilize symmetric key cryptography in accordance with the advanced encryption standard (AES) in one embodiment. A logical operation (e.g., a bit-by-bit XOR operation, another logical operation, etc.) may then be performed on the result of the first encryption and the UID. Thereafter, SBK may be encrypted using the result of the logical operation as the encryption key, where the encryption may utilize symmetric key cryptography in accordance with the advanced encryption standard (AES) in one embodiment. It should be appreciated that the results of one or more of the intermediary operations may be padded to a larger size (e.g., with zeros, with a pattern of ones and zeros, with a duplication of at least a portion of the result, etc.). For example, the device key (DK) may be padded (e.g., before encryption, after encryption, etc.) to the size of the UID to enable a bit-by-bit XOR operation, other data may be padded, etc.

Thus, use of such a secure key may increase computer system security (e.g., of device 110, system 100, data stored on or otherwise accessible to components of system 100, etc.) as the secure key may be generated by a secure component (e.g., secure encryption engine 118) during a secure mode (e.g., a secure boot mode during execution of secure boot code 114). In this manner, the secure key may be accessible and known only by components of device 110 (e.g., and not external components, systems, entities, human users, etc.). As a further example, if a device manufacturer (e.g., of device 110) secretly programs or provides the unique device identifier (e.g., 350) and a system manufacturer (e.g., of system 100 who incorporates device 110 within system 100) secretly programs or provides the secret key (e.g., SBK 330), then neither party may be aware of both the unique identifier and the secret key. Thus, in this example, it follows that no one (including either party) is able to calculate or otherwise generate the secure key.

Use of such a secure key may further enhance computer system security since discovery of the secure key does not automatically reveal the secret key (e.g., SBK 330) or other data used to generate the key. Further, given that at least one encryption operation is used to generate the secure key, reverse engineering the secure key to discover the data used to generate the key is difficult.

As shown in FIG. 1, device 110 may include multiple domains such as always on (A/O) domain 111 and controllable supply potential domain 160 (e.g., comprising memory 113, processor 115, processor 116, engine 118, and system controllers 119a-119c). The power to components in the controllable supply potential domain (e.g., 160) may be regulated, reduced, turned off, etc. in one embodiment, while power to the components in the A/O domain (e.g., 111) may generally be maintained. Thus, information may be temporarily or permanently moved to A/O domain 111 (e.g., stored within A/O registers 112) so that it is not lost during a reduction or termination of power to at least one component in domain 160 (e.g., during a reset or power-down of device 110, system 100, etc.). A/O registers 112 may store secure information (e.g., a secure key or SSK generated by engine 118, a secret key or SBK 330, etc.) in one embodiment. Additionally, read access and/or write access to A/O registers 112 may be limited (e.g., individually or in groups) by setting "sticky" or persistent bits, where the sticky bits may also reside within the A/O domain (e.g., 111).

Device 110 may also include controllable frequency domain 170 (e.g., comprising units 117). Units 117 may include hardware, software, or some combination thereof (e.g., firmware, etc.), which may be used to generate different frequencies or may be configured using the different frequencies. In one embodiment, units 117 may include at least one phase-locked loop (PLL) which may be configured using hardware and/or software to generate a signal (e.g., a clock signal) of a certain frequency. For example, a clock signal generated by at least one PLL of units 117 may be sent to a peripheral (e.g., 120-150) via a corresponding system controller (e.g., 119a-119c) to adjust the performance of the peripheral. As such, a peripheral may be configured to perform at a beginning or lower performance level initially (e.g., during execution of secure boot code 114), and then be configured for higher performance (e.g., by increasing the frequency of the clock signal) at some future point (e.g., during subsequent execution of secure boot code 114). Thus, embodiments enable device 110 to be used in conjunction with a variety of peripherals (e.g., higher-performance peripherals, lower-performance peripherals, peripherals of different types, etc.), thereby providing design and/or pricing flexibility to a system manufacturer (e.g., of system 100). In other embodiments, units 117 may configure different components of system 100 (e.g., system controller 119a-119c, etc.) and/or alternatively configure components of system 100 (e.g., by varying parameters other than or in addition to frequency, etc.).

Figure 2:
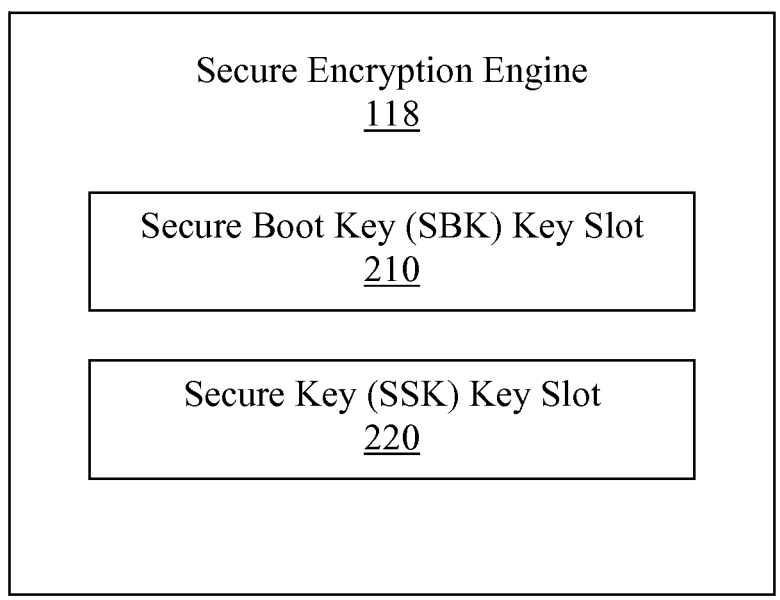
FIG. 2 shows a block diagram of an exemplary secure encryption engine in accordance with one embodiment of the present invention.
Figure 3:
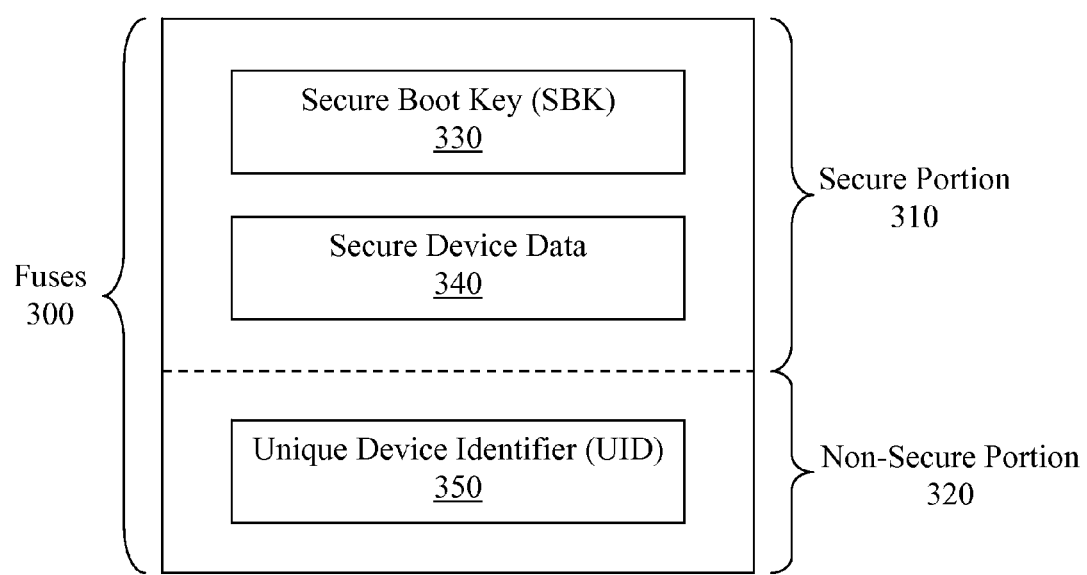
FIG. 3 shows a block diagram of exemplary fuses in accordance with one embodiment of the present invention.

Although FIGS. 1, 2 and 3 depict components of system 100 with specific features, it should be appreciated that the features of system 100 as depicted in FIGS. 1 through 3 are exemplary, and therefore, may be alternatively configured in other embodiments. Additionally, it should be appreciated that system 100 and/or device 110 may include a different number and/or configuration of components in other embodiments. Further, it should be appreciated that components of system 100 and/or device 110 may implement a secure chain of trust involving any number of secure and/or non-secure applications and/or data. For example, control may be passed to a larger or smaller number of secure boot codes before passing control to a larger or smaller number of less-secure or non-secure applications in one embodiment.

Figure 4A:
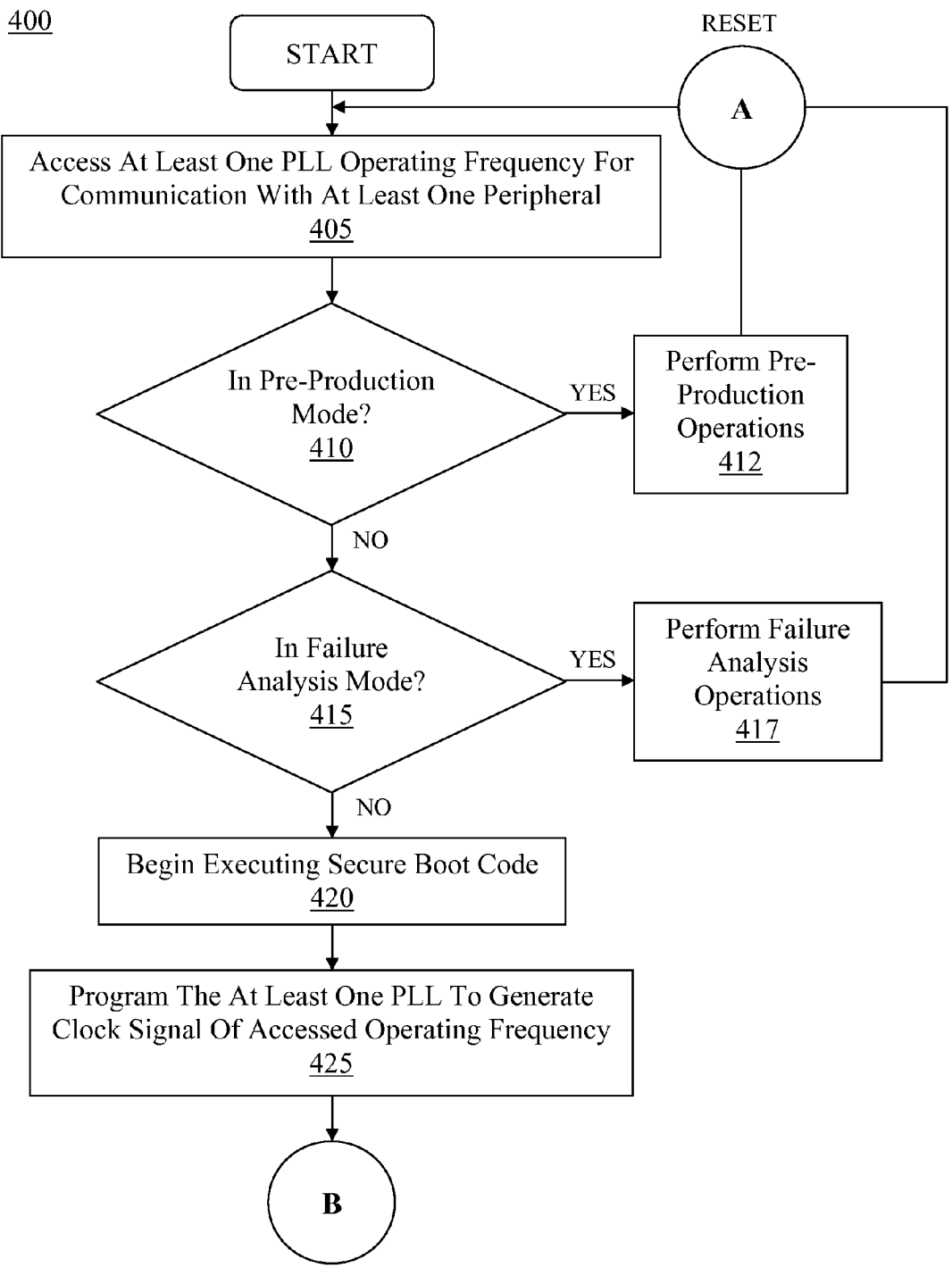
FIG. 4A shows a flowchart of a first portion of an exemplary computer-implemented process for implementing a secure chain of trust for a programmable integrated circuit in accordance with one embodiment of the present invention.

FIGS. 4A-4D show a flowchart of exemplary computer-implemented process 400 for implementing a secure chain of trust for a programmable integrated circuit in accordance with one embodiment of the present invention. As shown in FIG. 4A, step 410 involves accessing at least one PLL operating frequency for communication with at least one peripheral. The accessed operating frequency may correspond to a clock signal fed from the PLL (e.g., of units 117) to at least one component (e.g., system controllers 119a-119c, peripherals 120-150, etc.) for enabling at least one peripheral (e.g., 120-150) to communicate with device 110. In one embodiment, the operating frequency accessed in step 405 may be an initial or base operating frequency which will operate various devices of a certain type, various types of devices, etc.

Step 410 involves determining if the device (e.g., 110) and/or system (e.g., 100) is in a pre-production mode. A pre-production mode status may be indicated by at least one component (e.g., bit, strap pin, fuse, etc.) which is placed in a state indicating a pre-production mode. The component indicating the pre-production mode status may be located in A/O registers 112, one or more of peripherals 120-150, fuses 300, another component of or accessible to system 100, some combination thereof, etc. If it is determined that device 110 and/or system 100 is in a pre-production mode, then step 412 may be performed.

A manufacturer (e.g., of device 110, system 100, etc.) may program at least one component (e.g., specifying SBK 330, secure device data 340, UID 350, etc.), perform initial configuration or debugging before shipping the product (e.g., device 110, system 100, etc.) to another entity, etc., in step 412 when in a pre-production mode. Alternatively, when in a pre-production mode, step 412 may involve entering a recovery mode (e.g., a UART recovery mode involving the executing of recovery code stored on a UART peripheral of peripherals 120-150) and performing recovery operations (e.g., to download, decrypt, authenticate, etc. new secure boot code 114, new less-secure boot code 155, a new application 145, etc.). Step 412 may be performed in accordance with process 500 of FIG. 5 in one embodiment. After performing step 412, a reset of device 110 and/or system 100 may be executed before repeating steps 405 and 410 in one embodiment.

Alternatively, if it is determined that device 110 and/or system 100 is not in a pre-production mode in step 410, then it may be determined in step 415 whether device 110 and/or system 100 is in a failure analysis mode. A failure analysis mode status may be indicated by at least one component (e.g., bit, strap pin, fuse, etc.) which is placed in a state indicating a failure analysis mode. The component indicating the failure analysis mode status may be located in A/O registers 112, one or more of peripherals 120-150, fuses 300, another component of or accessible to system 100, some combination thereof, etc. If it is determined that device 110 and/or system 100 is in a failure analysis mode, then step 435 may be performed.

A manufacturer (e.g., of device 110, system 100, etc.) and/or service representative may program at least one component, perform debugging operations on at least one component, etc., in step 435 when in a failure analysis mode. Access to secure information (e.g., on device 110, on system 100, etc.) may be limited or disabled when in failure analysis mode. In one embodiment, when in a failure analysis mode, step 435 may involve entering a recovery mode (e.g., a UART recovery mode involving the executing of recovery code stored on a UART peripheral of peripherals 120-150) and performing recovery operations (e.g., to download, decrypt, authenticate, etc. new secure boot code 114, new less-secure boot code 155, a new application 145, etc.). One or more operations (e.g., recovery operations) may only be performed in step 435 if a predetermined piece of data (e.g., specifying SBK 330, secure device data 340, UID 350, etc.) is provided and matches other data (e.g., UID 350, etc.), thereby reducing unauthorized access and/or making it harder for an end-user to place device 110 and/or system 100 in the failure analysis mode and download data to the device (e.g., 110). Step 435 may be performed in accordance with process 600 of FIG. 6 in one embodiment. After performing step 435, a reset of device 110 and/or system 100 may be executed before repeating steps 405-415 in one embodiment.

Alternatively, if it is determined that device 110 and/or system 100 is not in a failure analysis mode in step 415, then secure boot code (e.g., 114) may be executed (e.g., by processor 115) in step 420. Accordingly, in one embodiment, commencing execution of secure boot code (e.g., 114) in step 420 may signify entry of a secure boot mode.

As shown in FIG. 4A, step 425 involves programming at least one PLL (e.g., of units 117) to generate a clock signal with an operating frequency accessed in step 405. The clock signal may be fed from the PLL (e.g., of units 117) to at least one component (e.g., system controllers 119a-119c, peripherals 120-150, etc.) for enabling at least one peripheral (e.g., 120-150) to communicate with device 110. In one embodiment, the PLL programming of step 425 may provide a clock signal with an initial or base operating frequency which will operate various devices of a certain type, various types of devices, etc.

Figure 4B:
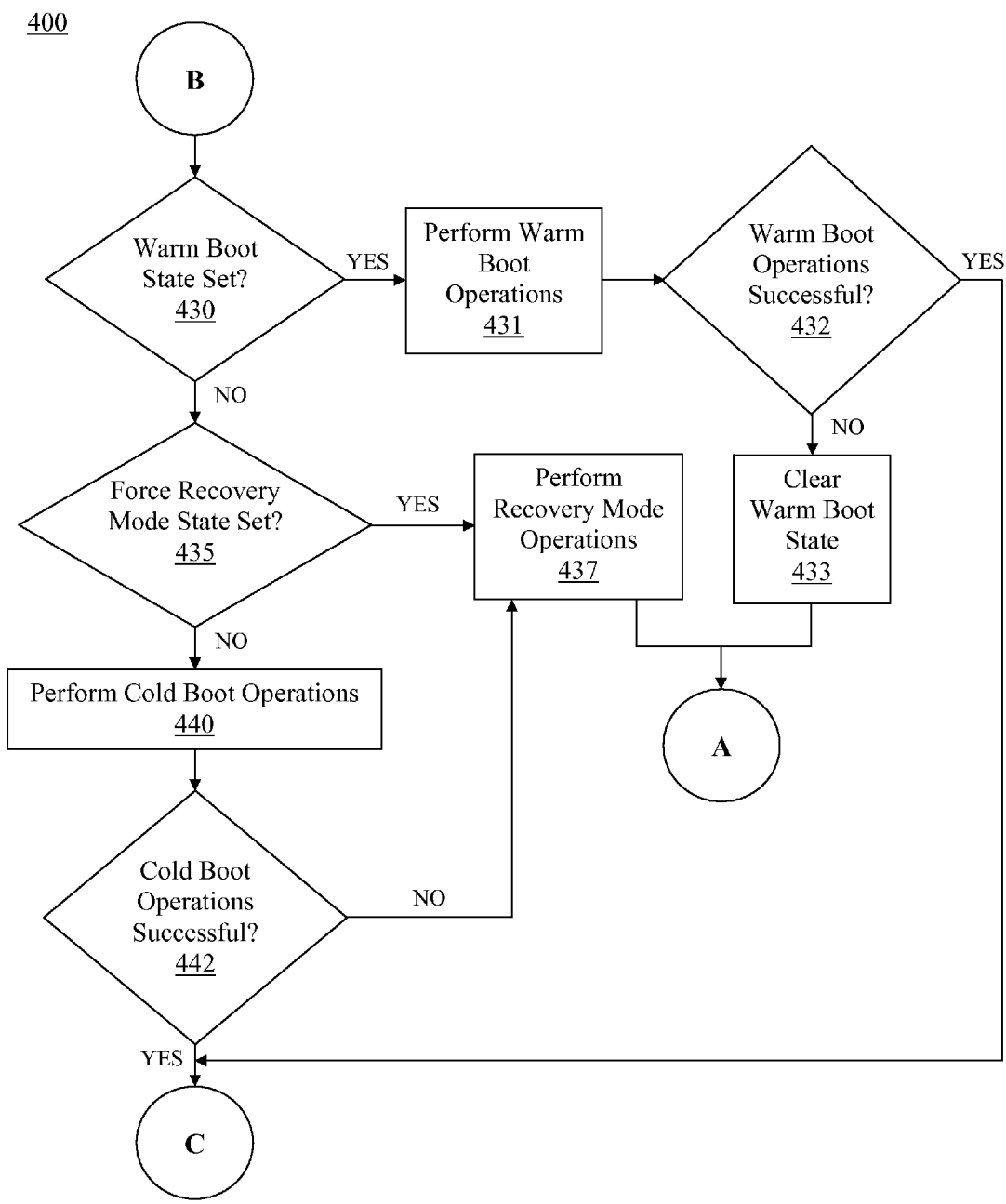
FIG. 4B shows a flowchart of a second portion of an exemplary computer-implemented process for implementing a secure chain of trust for a programmable integrated circuit in accordance with one embodiment of the present invention.

As shown in FIG. 4B, step 430 involves determining whether a warm boot state is set. A warm boot state may be indicated by at least one component (e.g., bit, strap pin, fuse, etc.) of device 110 and/or system 100. The component indicating the warm boot state may be located in A/O registers 112, one or more of peripherals 120-150, fuses 300, another component of or accessible to system 100, some combination thereof, etc. Device 110 and/or system 100 may be in a warm boot state in response to a reboot of device 110 and/or system 100 (e.g., in response to performing a recovery operation, loading new or updating secure boot code, loading new or updating less-secure boot code, changing the supply potential of one or more components in the controllable supply potential domain 160, etc.). If it is determined that a warm boot state is set, then warm boot operations may be performed in step 431.

Figure 7:
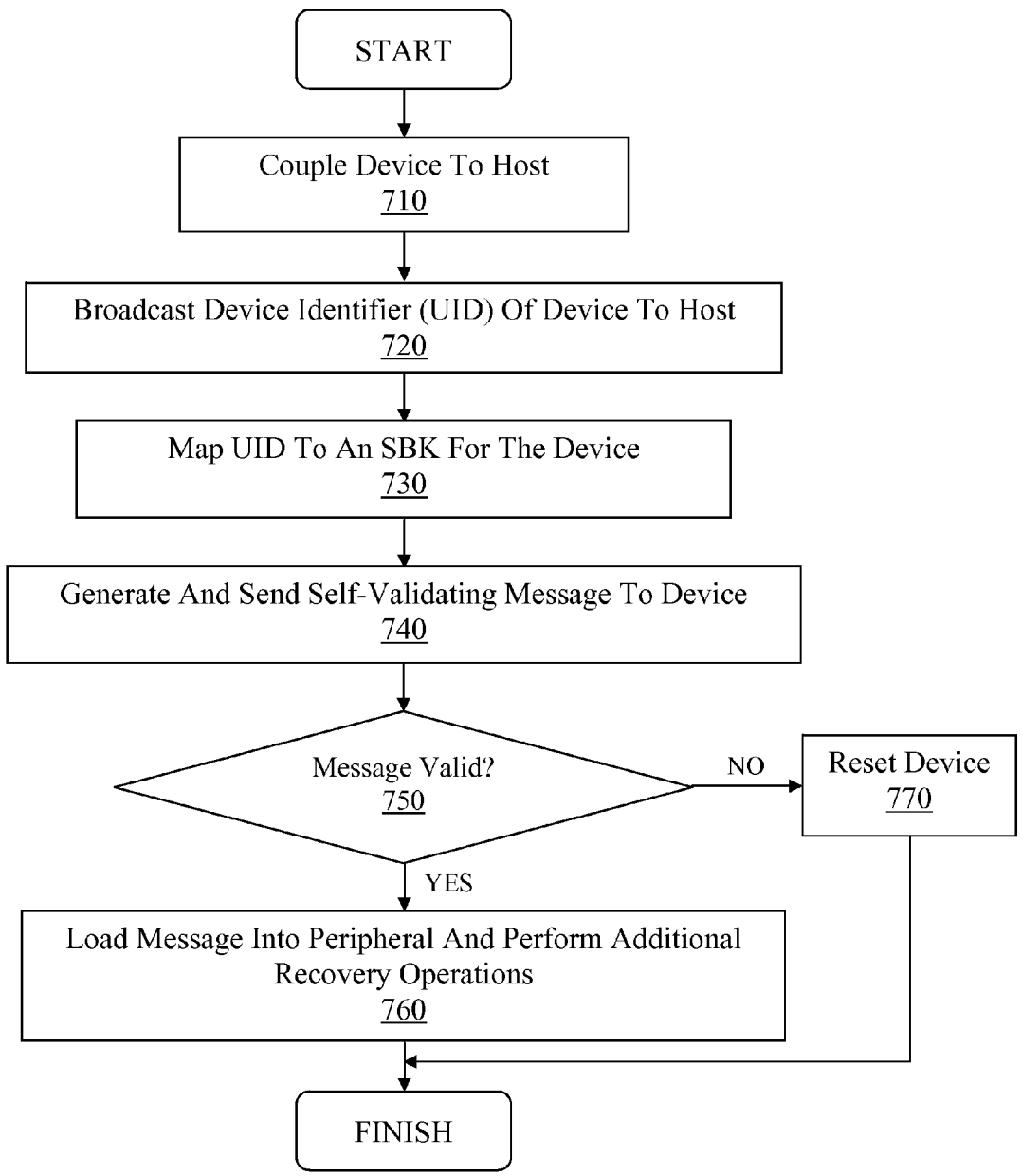
FIG. 7 shows a flowchart of an exemplary computer-implemented process for performing recovery operations in accordance with one embodiment of the present invention.

Step 431 may be performed in accordance with process 700 of FIG. 7 in one embodiment. If the warm boot operations are successful as determined in step 432, then step 450 may be performed as discussed herein. If the warm boot operations are not successful, then the warm boot state may be cleared (e.g., by setting a new bit, strap pin, fuse, etc., by resetting the warm boot bit, strap pin, fuse, etc.) and a reset of device 110 and/or system 100 may be initiated (e.g., before repeating steps 405-430). In one embodiment, clearing the warm boot state in step 433 may induce performance of at least one recovery operation (e.g., in step 437) and/or at least one cold boot operation (e.g., in step 440) upon reset of device 110 and/or system 100.

Alternatively, if it is determined in step 430 that a warm boot state is not set, then it may be determined in step 435 whether a force recovery mode state is set. A force recovery state may be indicated by at least one component (e.g., bit, strap pin, fuse, etc.) of device 110 and/or system 100. The component indicating the force recovery state may be located in A/O registers 112, one or more of peripherals 120-150, fuses 300, another component of or accessible to system 100, some combination thereof, etc. If a force recovery mode state is set as determined in step 435, then recovery mode operations may be performed in step 437.

In one embodiment, the setting of the force recovery mode state and the performance of recovery mode operations in step 437 may be performed in response to a failure to read, decrypt, or authenticate (e.g., using engine 118) boot code (e.g., less-secure boot code 155). In this manner, recover operations performed in step 437 may be used to "de-brick" or return device 110 and/or system 100 from a locked or "bricked" (e.g., non-operational) state. Alternatively, recovery operations performed in step 437 may be used in the manufacturing stage to load data (e.g., SBK 330, secure device data 340, UID 350, etc.) onto device 110 and/or system 100 (e.g., for the first time). And in one embodiment, step 437 may be performed in accordance with process 700 of FIG. 7.

Turning to FIG. 7, step 710 involves coupling device 110 to a host system or device directly or through a network. At least one of peripherals 120-150 may implement a communication channel with the host, where the communication channel may operate in accordance with the USB standard, USB 2.0 standard, Firewire standard, PCI-Express standard, SATA standard, eSATA standard, etc., in one embodiment. Device 110 may broadcast the UID (e.g., 350) of device 110 to the host over the communication channel in step 720. The UID (e.g., 350) may be mapped by the host to a given SBK (e.g., 330) in step 730. The host may then generate and send a self-validating message to the device 110 in step 740.

The message sent from the host to the device (e.g., 110) may include an unsecure length, a hash, a random AES block, a secure length, commands (e.g., header data) and data (e.g., other data), a payload, and padding (e.g., 0X80 followed by additional 0X00 bytes as needed). The random AES block, secure length, commands and data, payload, padding, or some combination thereof, may be encoded or encrypted using the SBK mapped to the UID (e.g., 350).

As shown in FIG. 7, once the message is received by device 110 and/or system 100, it may be validated (e.g., using SBK 330) in step 750. In one embodiment, the message may be determined to be valid if the unsecure length matches the secure length, the hash is correct, at least one of the commands is valid (e.g., valid command types for the given message), if the size of the message is correct (e.g., as specified by the commands and data), if the size of the payload is correct, if the padding pattern is correct, if a version number of the secure boot code in the commands and data matches a version number of the secure boot code on device 110 (e.g., 114), if a version number of the secure boot code in the commands and data matches a version number of the less-secure boot code on device 110 (e.g., 155), some combination thereof, etc.

If the message is validated (e.g., is determined to be valid), the device (e.g., 110) may load the message into a peripheral (e.g., 120-150) and perform additional recovery mode operations in step 760. The additional recovery mode operations may involve executing one or more commands in the message, executing code contained in the message, storing the less-secure boot code (e.g., 155) from the message into a given peripheral (e.g., 120-150), or some combination thereof. For example, if the less-secure boot code (e.g., 155) is received in the message, the less-secure boot code is stored in a peripheral (e.g., 120-150) encoded using the SBK (e.g., 330). Alternatively, the device (e.g., 110) can download and authenticate additional data from the host. The additional data may be encrypted and signed, using the SBK (e.g., 330), before writing it to a peripheral (e.g., 120-150). In this manner, the recovery mode of process 700 can provide for multiple message transmission and response sequences. Alternatively, if the message does not validate (e.g., is determined not be valid in step 750), the device (e.g., 110) may be reset (e.g., by entering an infinite loop requiring a system reset to proceed, automatically initiating a system or device reset, etc.) in step 770.

Alternatively, if it is determined in step 435 that a force recovery mode state is not set, then cold boot operations may be performed in step 440. For example, less-secure boot code (e.g., 155) may be read, decrypted, authenticated, some combination thereof, etc. in step 440 to implement a secure chain of trust (e.g., from the execution of secure boot code 114 in the secure boot mode to the execution of less-secure boot code 155 in the less-secure boot mode) for device 110 and/or system 100. Additionally, the secure key (e.g., SSK) may be calculated and/or generated as a cold boot operation in step 440. Cold boot operations may be performed in response to a power-on of device 110 and/or system 100 in one embodiment. Additionally, step 440 may be performed in accordance with process 900 of FIG. 9 in one embodiment. If the cold boot operations are not successful as determined in step 442, then step 437 may be performed as discussed herein. Alternatively, if the cold boot operations are successful, then step 450 may be performed as discussed herein.

Figure 4C:
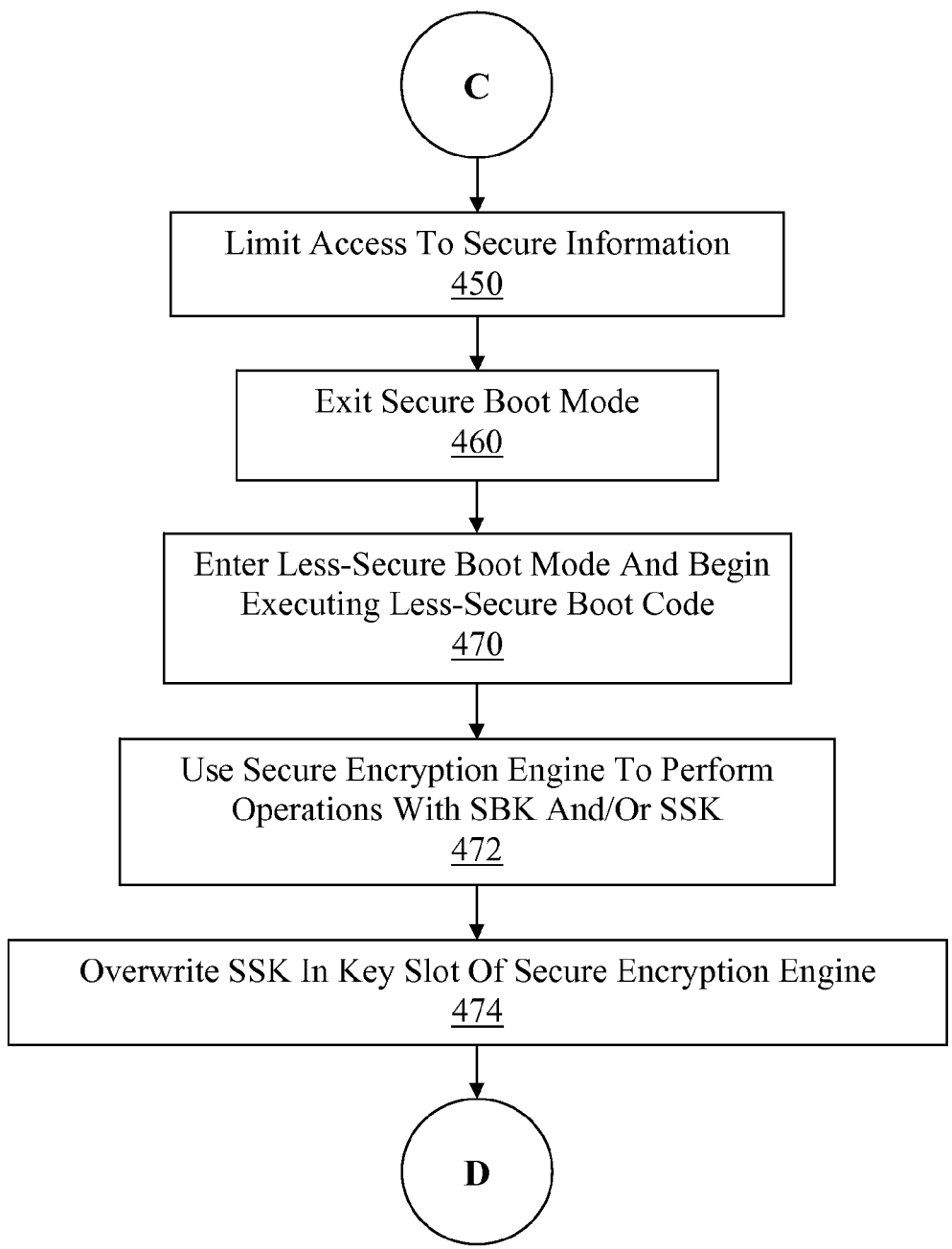
FIG. 4C shows a flowchart of a third portion of an exemplary computer-implemented process for implementing a secure chain of trust for a programmable integrated circuit in accordance with one embodiment of the present invention.

As shown in FIG. 4C, step 450 involves limiting access to secure information (e.g., secret key (e.g., SBK 330), secure key (SSK), information used to generate the secure key, etc.). Such access may be limited by setting a "sticky" or persistent bit corresponding to a register (e.g., A/O registers 112), key slot (e.g., 210 and/or 220), or other storage media storing the secure information. In this manner, read and/or write access to the secure information may be limited. Alternatively, the secure information may be flushed (e.g., overwritten with zeros, overwritten with other information, cleared, etc.) from a register (e.g., A/O registers 112), key slot (e.g., 210 and/or 220), or other storage media storing the secure information.

Step 460 involves exiting the secure boot mode. Execution of the secure boot code (e.g., 114) may be terminated and/or control may be transferred to less-secure boot code (e.g., 155) in step 460.

As shown in FIG. 4C, step 470 involves entering the less-secure boot mode and beginning execution of less-secure boot code (e.g., 155). The less-secure boot code (e.g., 155) may be executed by a processor (e.g., 115) of the device (e.g., 110) and/or system (e.g., 100). Additionally, the less-secure boot code (e.g., 155) may be stored locally on a memory (e.g., 160) of the device (e.g., 110) and/or system (e.g., 100).

Step 472 involves using the secure encryption engine (e.g., 118) to perform operations with the SBK (e.g., 330) and/or the secure key. For example, the secure encryption engine may be used to perform encryption operations and/or or decryption operations (e.g., where SBK 330 or the secure key is used as the encryption key), where the data to be encrypted and/or decrypted is passed to the secure encryption engine (e.g., to be encrypted and/or decrypted within secure encryption engine 118) and the secure encryption engine (e.g., 118) subsequently outputs the processed (e.g., encrypted, decrypted, etc.) data. In this manner, SBK 330 and/or the secure key are kept secure (e.g., within key slots 210 and 220, respectively, of secure encryption engine 118) while enabling encryption and/or decryption operations to be performed in the less-secure boot mode. Similarly, the secure encryption engine (e.g., 118) may be used to perform authentication operations (e.g., where the digital signature is associated with SBK 330 and/or the secure key, where authentication of the data otherwise requires knowledge of SBK 330 and/or the secure key, etc.) and/or DRM operations. Again, the secure encryption engine (e.g., 118) may be used to limit or otherwise control access to SBK 330 and/or the secure key during the authentication and/or DRM operations.

As shown in FIG. 4C, step 474 involves overwriting the SSK in the key slot (e.g., 220) of the secure encryption engine (e.g., 118). The new SSK used in the overwriting may be specified (e.g., by a system manufacturer who also specifies SBK 330 and/or secure device data 340, etc.) in one embodiment. Alternatively, the SSK may be regenerated. For example, new secure device data 340 may be specified (e.g., by accessing different secure device data and using the new secure device data in the calculation of the SSK, reprogramming the fuses associated with secure device data 340 to change the content of secure device data 340, etc.).

Figure 4D:
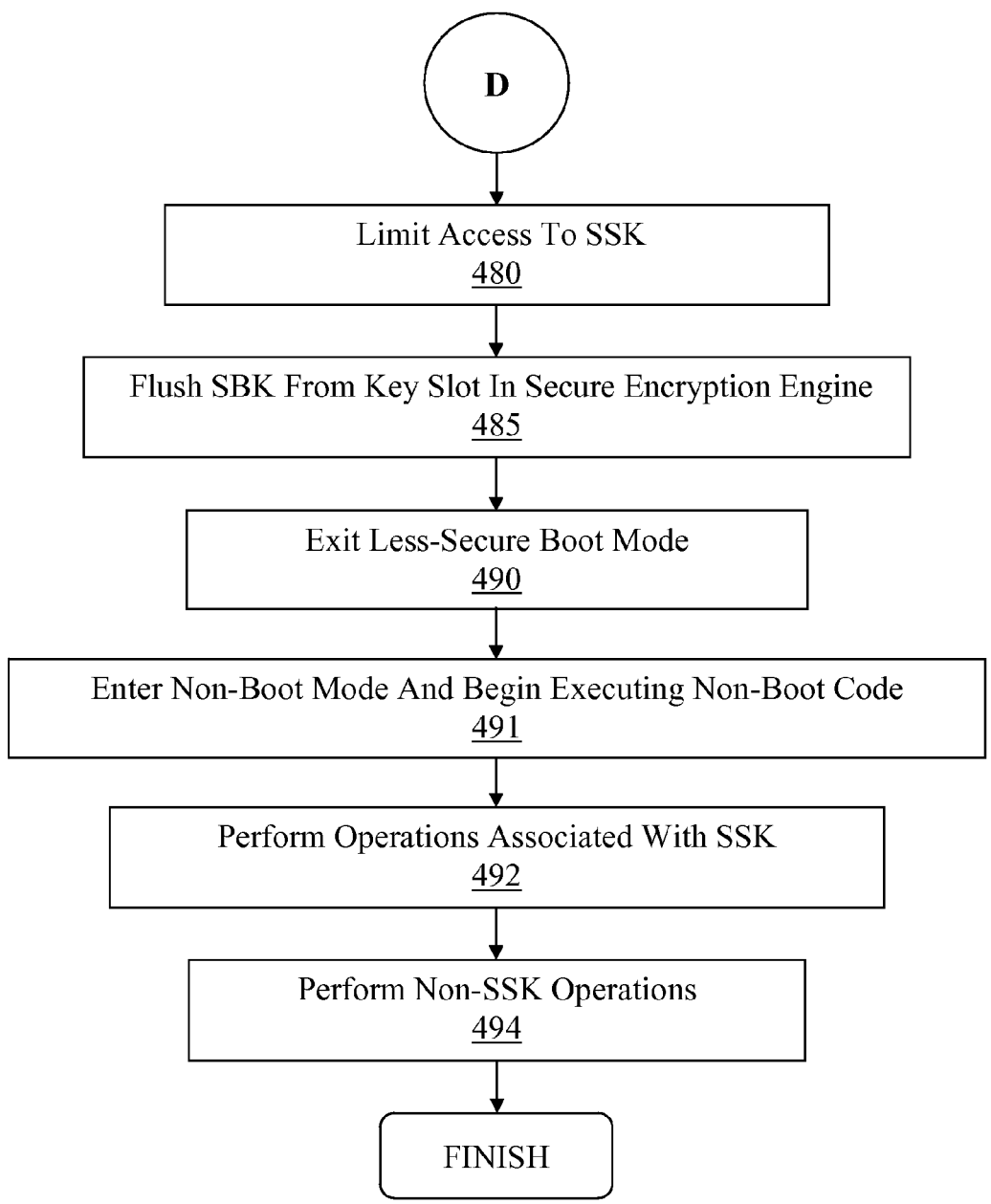
FIG. 4D shows a flowchart of a fourth portion of an exemplary computer-implemented process for implementing a secure chain of trust for a programmable integrated circuit in accordance with one embodiment of the present invention.

As shown in FIG. 4D, step 480 involves limiting access to the SSK (e.g., the secure key). For example, the secure encryption engine (e.g., 118) may limit access (e.g., designate as read-only, designate as write only, etc.) to a key slot (e.g., 220) storing the secure key. In another embodiment, registers (e.g., 112), caches or other memories storing information associated with the secure key may be flushed. And in one embodiment, access to registers (e.g., one or more A/O registers 112) may be limited by setting "sticky" or persistent bits (e.g., located in A/O domain 111, located on another portion of device 110, etc.).

Step 485 involves flushing the SBK (e.g., secret key 330) from the key slot (e.g., 210) in the secure encryption engine (e.g., 118). In one embodiment, the SBK flushing may be performed by writing all zeros into key slot 210. Alternatively, other data may be written to key slot 210. And in other embodiments, the secret key (e.g., 330, that stored in key slot 210, etc.) may be alternatively altered, hidden, removed, etc. Accordingly, in one embodiment, access to the SBK (e.g., 330) may be further limited (e.g., in addition to the limiting of step 450) to improve security of the SBK (e.g., 330) and/or any component (e.g., of device 110, system 100, etc.) using or otherwise accessing the SBK (e.g., 330).

As shown in FIG. 4D, step 490 involves exiting the less-secure boot mode. Step 491 involves entering a non-boot mode and beginning to execute non-boot code. In one embodiment, the less-secure boot code (e.g., 155) may finish executing and turn control over to other code (e.g., non-boot code such as application 145, etc.). The non-boot code (e.g., 145) may reside on a peripheral (e.g., 140) of the device (e.g., 110), and may be an operating system or other application for execution on the device (e.g., 110) and/or system (e.g., 100).

Step 492 involves performing operations associated with the SSK (e.g., the secure key). For example, an operating system or other application run on the system (e.g., 100) and/or device (e.g., 110) may access SSK and use SSK to encrypt, decrypt, authenticate, sign, etc. portions of data (e.g., video content, audio content, audio/video content, other data, etc.). In this manner, the SSK may be provided and used to secure data (e.g., video content, audio content, audio/video content, other data, etc.) stored on or otherwise accessed by the system (e.g., 100) and/or device (e.g., 110) while restricting access to information used to generate the SSK (e.g., SBK 330, secure device data 340, etc.). In another embodiment, data (e.g., video content, audio content, audio/video content, other data, etc.) may be passed to the secure encryption engine (e.g., 118) to perform the encrypting, decrypting, authenticating, signing, etc., thereby providing implementation flexibility and/or increased security where desired.

As shown in FIG. 4D, step 494 involves performing non-SSK operations. For example, tasks performed by an operating system or other application run on the system (e.g., 100) and/or device (e.g., 110) may access and/or process data without directly and/or indirectly relying upon the SSK. In one embodiment, these operations may be considered normal operations of the system (e.g., 100) and/or device (e.g., 110) without use of a secure key.

Figure 5:
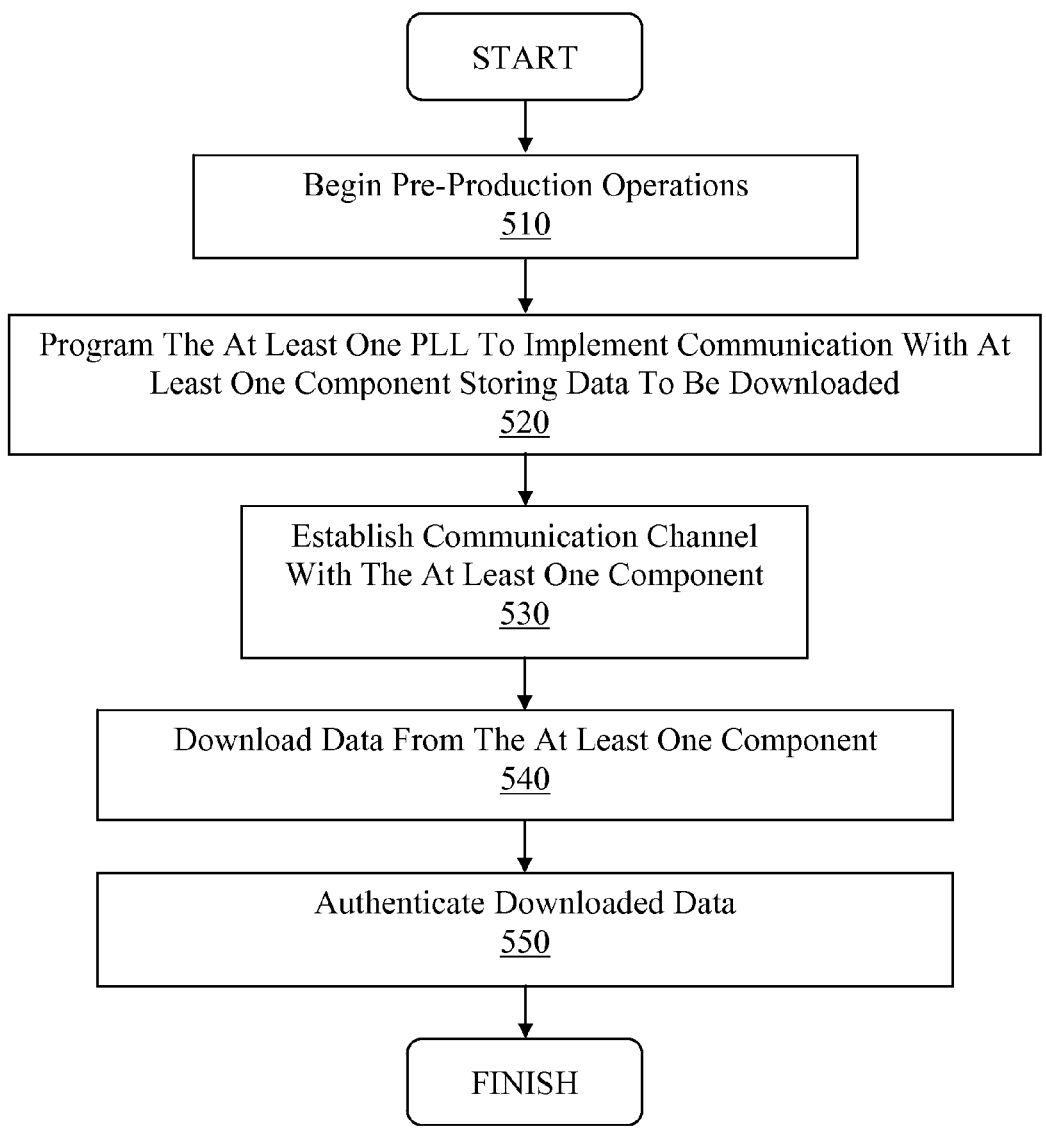
FIG. 5 shows a flowchart of an exemplary computer-implemented process for performing pre-production operations in accordance with one embodiment of the present invention.

FIG. 5 shows a flowchart of exemplary computer-implemented process 500 for performing pre-production operations in accordance with one embodiment of the present invention. Process 500 may be used to implement step 412 of FIG. 4 in one embodiment.

As shown in FIG. 5, step 510 involves beginning pre-production operations. In one embedment, step 510 may involve beginning to execute recovery code. The recovery code may be accessed from a peripheral (e.g., 120-150) in one embodiment. The peripheral may be a UART peripheral in one embodiment.

Step 520 involves programming at least one PLL (e.g., of units 117) to implement communication with at least one component storing data to be downloaded (e.g., to device 110). The programming may include configuring the PLL to generate a clock signal with an operating frequency enabling the peripheral (e.g., 120-150) to establish the communication channel. The one or more components may be a peripheral (e.g., 120-150) of the system (e.g., 100) coupled to a programmable integrated circuit (e.g., device 110). Alternatively, the one or more components may be located externally to the system (e.g., 100) and be communicatively coupled to the device (e.g., 110).

As shown in FIG. 5, step 530 involves establishing the communication channel with the at least one component. For example, components (e.g., system controllers 119a-119c, etc.) of the system (e.g., 100) and/or the device (e.g., 110) may access a clock signal generated by the PLLs in one embodiment. One or more messages (e.g., implementing a "handshake" or the like) may be sent between components (e.g., system controllers 119a-119c, processor 115, etc.) of the device (e.g., 110) and the at least one component (e.g., peripherals 120-150, components external to system 100, etc.) to establish the communication channel.

Step 540 involves downloading data from the one or more components. The data may include new or updated boot code (e.g., secure boot code 114, less-secure boot code 155, etc.). In another embodiment, the data may include an application (e.g., 145) and/or data for access by components of the device (e.g., 110) and/or the system (e.g., 100).

As shown in FIG. 5, step 550 involves authenticating the downloaded data. The data may be authenticated using a secret key (e.g., SBK 330), a secure key, or the like. Additionally, the data may be authenticated and/or otherwise processed (e.g., decrypted, encrypted, etc.) in a secure environment (e.g., within secure encryption engine 118).

Figure 6:
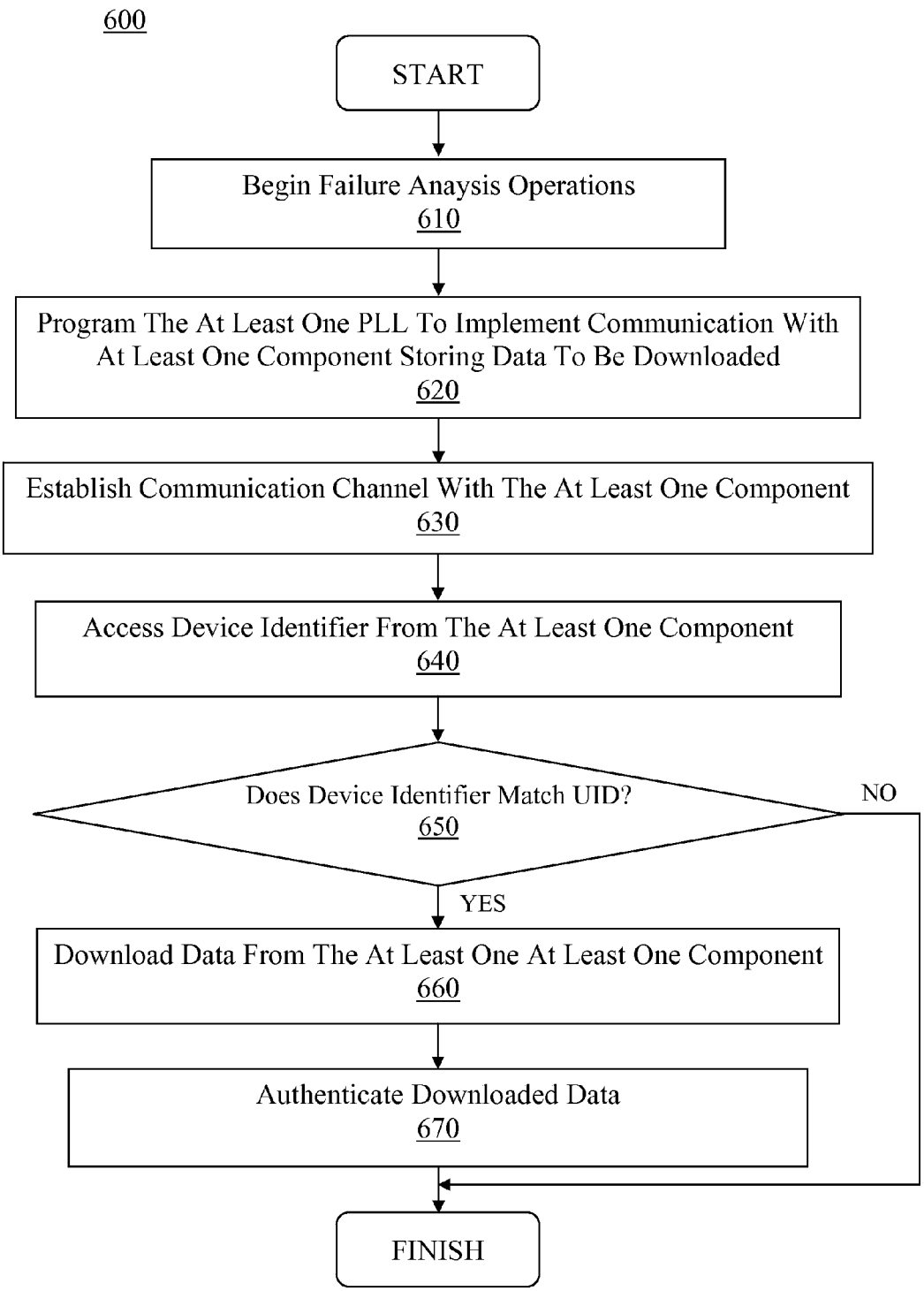
FIG. 6 shows a flowchart of an exemplary computer-implemented process for performing failure analysis operations in accordance with one embodiment of the present invention.

FIG. 6 shows a flowchart of exemplary computer-implemented process 600 for performing failure analysis operations in accordance with one embodiment of the present invention. Process 600 may be used to implement step 417 of FIG. 4 in one embodiment.

As shown in FIG. 6, step 610 involves beginning failure analysis operations. In one embedment, step 610 may be performed analogously to step 510 of process 500. Additionally, steps 620 and 630 of process 600 may be performed analogously to steps 520 and 530 of process 500 in one embodiment.

As shown in FIG. 6, step 640 involves accessing a device identifier from the one or more components (e.g., one or more of peripherals 120-150). For example, a request may be made for such a device identifier to the at least one component and/or the at least one component may broadcast such a device identifier without a formal request from the device (e.g., 110).

Step 650 involves determining whether the device identifier accessed from the at least one component (e.g., one or more of peripherals 120-150) matches the UID (e.g., 350) of the device (e.g., 110). Steps 640 and 650 may be performed to reduce unauthorized access and/or making it harder for an end-user to place device 110 and/or system 100 in the failure analysis mode and download data to the device (e.g., 110). If the device identifier does not match the UID (e.g., 350), then process 600 may terminate. Alternatively, if the device identifier does match the UID (e.g., 350), then step 660 may be performed. Steps 660 and 670 of process 600 may be performed analogously to steps 540 and 550 of process 500 in one embodiment.

Figure 8:
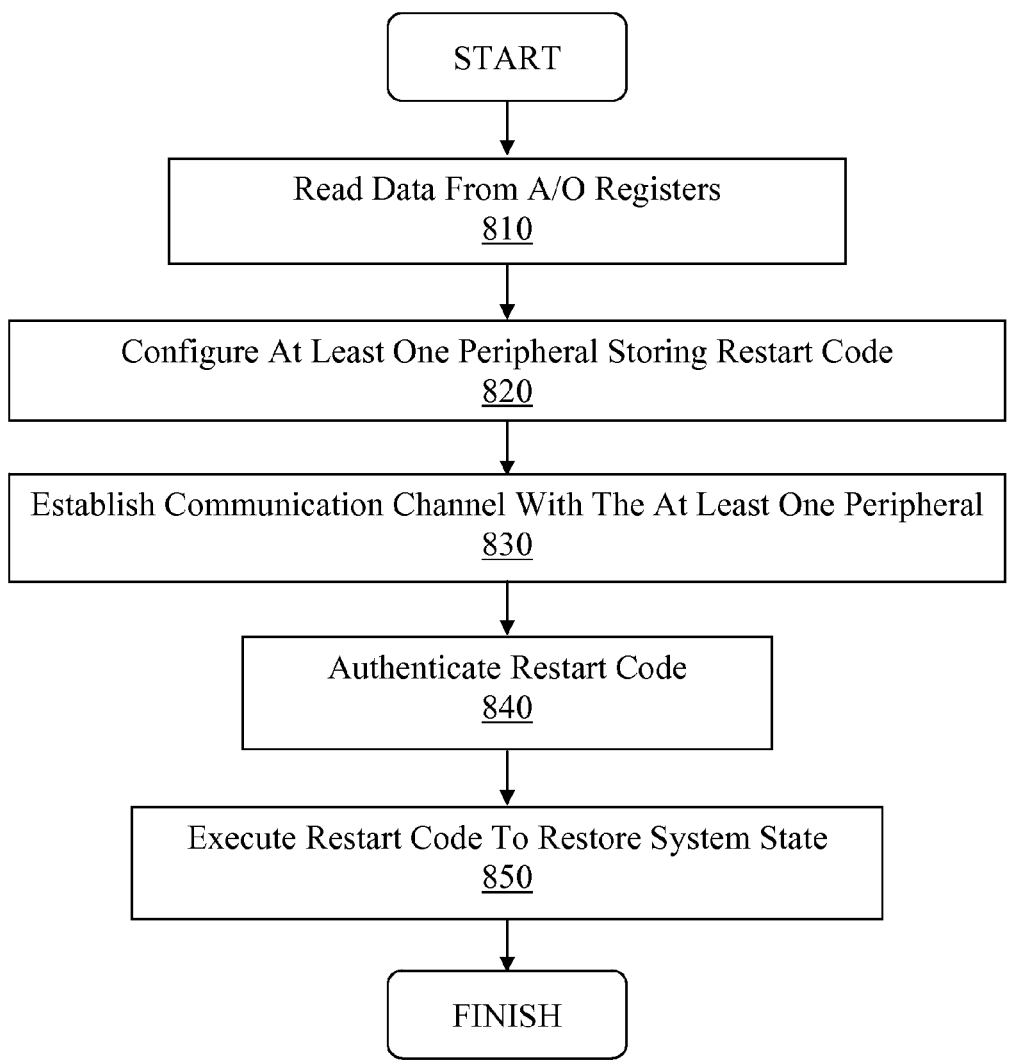
FIG. 8 shows a flowchart of an exemplary computer-implemented process for performing a warm boot in accordance with one embodiment of the present invention.

FIG. 8 shows a flowchart of exemplary computer-implemented process 800 for performing a warm boot in accordance with one embodiment of the present invention. Process 800 may implement step 431 of process 400 in one embodiment. Additionally, process 800 may be performed after a reset of the device (e.g., 110) and/or the system (e.g., 100) in one embodiment.

As shown in FIG. 8, step 810 involves reading data from always-on (A/O) registers (e.g., 112). The data may include peripheral configuration information (e.g., SDRAM configuration information, PLL configuration information such as operating frequencies for components accessing the clock signal generated by the PLL, settings for device 110, settings for system 100, etc.). The data may also include an address of the restart code (e.g., executed in step 850). Additionally, in one embodiment, the data may include a fingerprint (e.g., a non-secure hash value for the restart code, a secure hash value for the restart code, etc.) or other information about the restart code.

Step 820 involves configuring at least one peripheral (e.g., 120-150) storing the restart code. For example, where an SDRAM peripheral (e.g., one of peripherals 120-150 coupled to device 110) stores the restart code, the SDRAM may be taken out of a self-refresh mode. Additionally, the peripheral may be further configured (e.g., the operating frequency may be adjusted, a system controller coupled to the peripheral may be prepared to setup the communication channel for the peripheral, etc.).

As shown in FIG. 8, step 830 involves establishing the communication channel with at least one peripheral storing the restart code. Step 830 may be performed analogously to step 530 of process 500 in one embodiment.

Step 840 involves authenticating the restart code. The restart code may be validated or authenticated by computing a non-secure hash or digest of the restart code stored on the peripheral. If the hash or digest matches the fingerprint accessed from the A/O register (e.g., 112) in step 810, then the restart code may be executed in step 850 to restore the system state. In one embodiment, the restart code may include a vector, and therefore, step 850 may involve jumping to the restart vector (e.g., in the SDRAM or other peripheral) to restore the system state.

Figure 9:
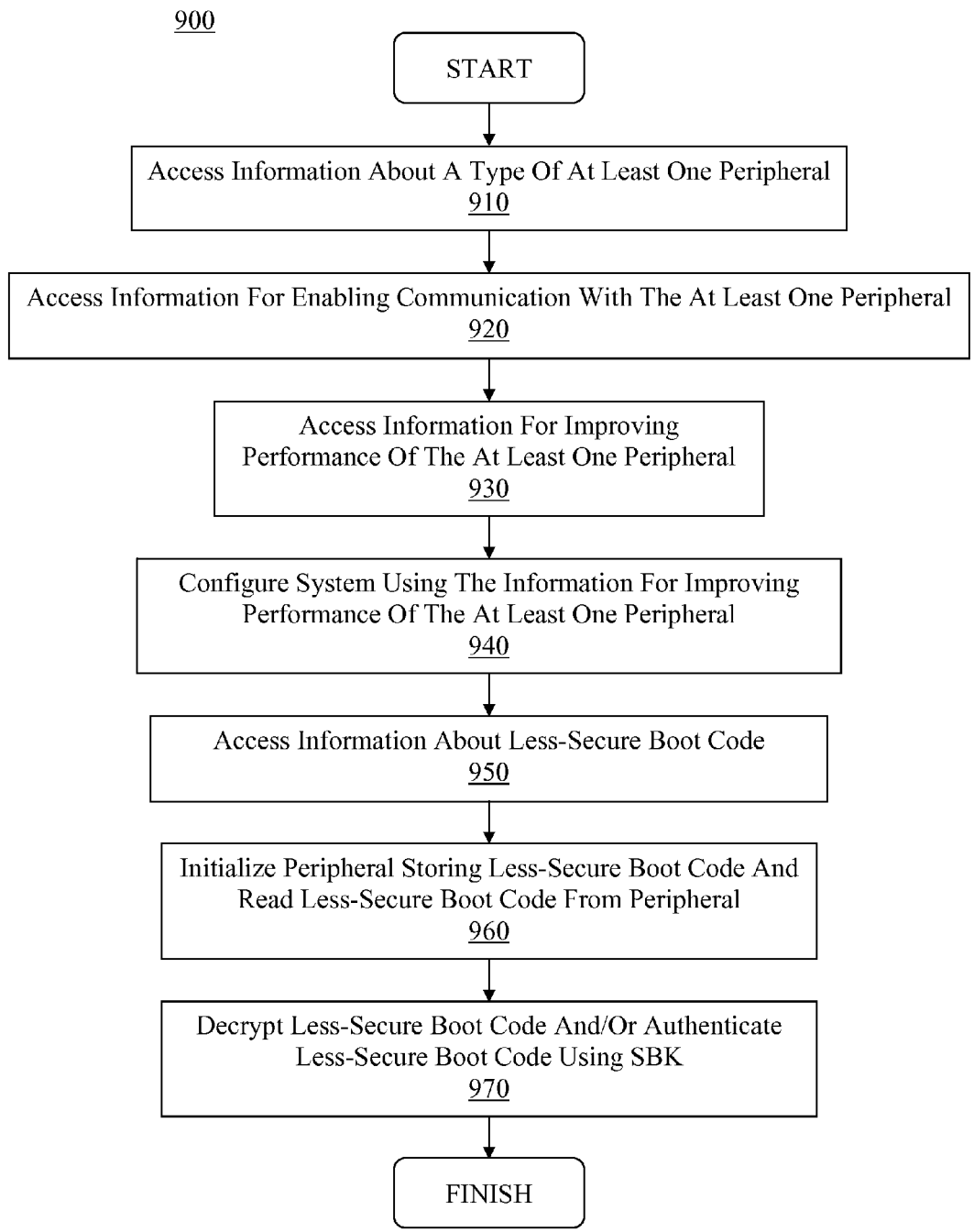
FIG. 9 shows a flowchart of an exemplary computer-implemented process for performing a cold boot in accordance with one embodiment of the present invention.

FIG. 9 shows a flowchart of exemplary computer-implemented process 900 for performing a cold boot in accordance with one embodiment of the present invention. Process 900 may implement step 440 of process 400 in one embodiment. Additionally, process 900 may be performed after a power-on of the device (e.g., 110) and/or the system (e.g., 100) in one embodiment.

Step 910 involves accessing information about a type of at least one peripheral. For example, the type of one or more of the peripherals (e.g., 120-150) coupled to the device (e.g., 110) may be identified. Peripheral types may include NOR, NAND, SPI, MMC, other peripheral types, etc. The information about the peripheral types may be stored in fuses (e.g., 300) of the device (e.g., 110) in one embodiment. The information about the peripherals may be stored in other portions of device 110 (e.g., in strap pins, etc.) in one embodiment.

As shown in FIG. 9, step 920 involves accessing information for enabling communication with at least one peripheral. In one embodiment, the information may include characteristics of the peripheral whose type was identified in step 910. For example, the information may include a type of ECC to be used when communicating with the peripheral, address formatting for the communication, base or initial operating frequency to implementing the communication channel with the peripheral, etc. The information about the peripherals may be stored in fuses (e.g., 300) of the device (e.g., 110) in one embodiment.

Step 930 involves accessing information for improving the performance of the one or more peripherals. For example, an enhanced operating frequency for the peripheral may be accessed, where the enhanced operating frequency is higher than that accessed in step 920. The information may be accessed from a boot configuration table (BCT) of the peripheral after establishing a communication channel (e.g., operating at the base or initial operating frequency) with the peripheral. In this manner, the information accessed in step 910 and 920 may be used to establish a communication channel with the peripheral operating at a base or lower performance level, where information for improving the performance (e.g., increasing speed, bandwidth, etc.) of the peripheral and/or communication channel may be communicated over the implemented communication channel (e.g., in step 930) operating at the lower performance level.

As shown in FIG. 9, step 940 involves configuring the system (e.g., 100) using the information for improving the performance of the at least one peripheral (e.g., accessed in step 930). For example, one or more PLLs (e.g., of units 117) may generate higher frequency clock signals in accordance with the information for improving the performance of the at least one peripheral. Additionally, system controllers (e.g., 119a-119c) may be re-initialized for higher performance in step 940.

Step 950 involves accessing information about less-secure boot code (e.g., 155). For example, the location (e.g., load address, entry address, etc.) of the less-secure boot code (e.g., 155) may be accessed. Additionally, redundancy information for the less-secure boot code (e.g., 155) may be accessed, where the redundancy information may include pointers to different versions or generations of the less-secure boot code (e.g., for updating or reverting back to a previous generation), pointers to additional copies of the same generation of the less-secure boot code (e.g., for reloading the same generation due to error or other exception during the reading, updating, etc. of the less-secure boot code), etc.

As shown in FIG. 9, step 960 involves initializing the peripheral (e.g., 150) storing the less-secure boot code (e.g., 155) and read the less-secure boot code from the peripheral (e.g., 150). The initialization may include providing a clock signal (e.g., of a lower operating frequency based upon information accessed in step 920, of a higher operating frequency based upon information accessed in step 930, etc.) to the peripheral (e.g., 150), to a system controller (e.g., 119c) coupled to the peripheral, etc. Additionally, initialization of the peripheral may include communicating "handshake" or other information used to setup the communication channel between the peripheral (e.g., 150) and the device (e.g., 110).

Step 970 involves decrypting the less-secure boot code and/or authenticating the less-secure boot code using the SBK (e.g., 330). The SBK may be accessed from secure portion 310 of fuses 300, from key slot 210 of secure encryption engine 118, from an A/O register (e.g., 112) of device 110, etc. In one embodiment, once the less-secure boot code (e.g., 155) is decrypted (e.g., by secure encryption engine 118), it may be authenticated or validated by comparing a calculated hash or digest (e.g., calculated by engine 118 or another component of system 100) with the hash or digest associated with the less-secure boot code accessed in step 950.

In the foregoing specification, embodiments of the invention have been described with reference to numerous specific details that may vary from implementation to implementation. Thus, the sole and exclusive indicator of what is, and is intended by the applicant to be, the invention is the set of claims that issue from this application, in the specific form in which such claims issue, including any subsequent correction. Hence, no limitation, element, property, feature, advantage, or attribute that is not expressly recited in a claim should limit the scope of such claim in any way. Accordingly, the specification and drawings are to be regarded in an illustrative rather than a restrictive sense.

What is claimed is:

1. A method of implementing a secure chain of trust for a programmable integrated circuit, said method comprising:
    while executing a first boot code associated with a secure boot mode:
    accessing information about a peripheral for communicating with said programmable integrated circuit, wherein said peripheral is located external to said programmable integrated circuit;
    while executing said first boot code, configuring at least one component of said programmable integrated circuit to improve the performance of said peripheral, wherein said configuring further comprises configuring said at least one component based upon said information about said peripheral, wherein said configuring of said at least one component of said programmable integrated circuit comprises increasing a frequency of a clock signal;
    authenticating a second boot code using a secret key before said secure boot mode is exited and a less secure boot mode is entered;
    generating a secure key based upon said secret key and a unique identifier, wherein said secure key is generated in one of said secure boot mode and a combination secure/less secure boot mode and wherein said unique identifier is stored in said programmable integrated circuit;
    limiting access to said secret key before exiting said secure boot mode;
    while executing said second boot code in a boot mode, authenticating an application for execution on said programmable integrated circuit, wherein said authenticating further comprises authenticating said application using said secure key;
    while executing said first boot code in a secure boot mode, decrypting said second boot code using said secret key;
    while executing said second boot code in said boot mode, decrypting said application using said secure key; and
    exiting said boot mode and executing said application.

2. The method of claim 1, wherein said application comprises an operating system for execution by a processor of said programmable integrated circuit.

3. The method of claim 1 further comprising:
    using said secure key to perform an operation on data accessible to said programmable integrated circuit, and wherein said operation is selected from the group consisting of an encryption of said data and a decryption of said data.

4. The method of claim 1, wherein said unique identifier is provided by a first party, and wherein said secret key is provided by a second party.

5. The method of claim 1, wherein said execution of said first boot code in said secure boot mode comprises performing a boot process selected from a group consisting of a warm boot process and a cold boot process.

6. The method of claim 1 further comprising:
    determining a mode of said programmable integrated circuit; and
    if said programmable integrated circuit is placed in an operational mode, then performing said executing said first boot code.

7. An integrated circuit comprising:
    a memory for storing first boot code;
    a hardware processor coupled to said memory and for executing said first boot code in a secure boot mode of said integrated circuit, wherein said hardware processor is further operable to execute second boot code in a boot mode of said integrated circuit, and wherein said hardware processor is further for executing an application; and
    a secure encryption engine coupled to said hardware processor and for implementing a secure chain of trust by:
    accessing information about a peripheral for communicating with said programmable integrated circuit, wherein said peripheral is located external to said programmable integrated circuit;
    while executing said first boot code, configuring at least one component of said programmable integrated circuit to improve the performance of said peripheral, wherein said configuring further comprises configuring said at least one component based upon said information about said peripheral, wherein said configuring of said at least one component of said programmable integrated circuit comprises increasing a frequency of a clock signal;
    authenticating said second boot code using a secret key before said secure boot mode is exited and a less secure boot mode is entered;
    generating a secure key based upon said secret key and a unique identifier, wherein said secure key is generated in one of said secure boot mode and a combination secure/less secure boot mode and wherein said unique identifier is stored in said integrated circuit;
    while executing said first boot code in a secure boot mode, decrypting said second boot code using said secret key;
    while executing said second boot code in said boot mode, decrypting said application using said secure key; and
    authenticating said application using said secure key in said boot mode prior to execution of said application by said hardware processor.

8. The integrated circuit of claim 7, wherein said hardware processor is further operable to limit access to said secret key before exiting said secure boot mode.

9. The integrated circuit of claim 7, wherein said hardware processor is further operable to limit access to said secure key before exiting said boot mode.

10. The integrated circuit of claim 7, wherein said application comprises an operating system for execution by a hardware processor of said integrated circuit.

11. The integrated circuit of claim 7, wherein execution of said first boot code by said hardware processor implements a boot process selected from the group consisting of a warm boot process and a cold boot process.

12. The integrated circuit of claim 7 further comprising:
    at least one component operable to adjust the performance of a peripheral coupled to said hardware processor, wherein said peripheral is located externally to said integrated circuit; and
    wherein said hardware processor, while in said secure boot mode, is further operable to configure said at least component for improving the performance of said peripheral.

* * * * *